(12) United States Patent
Groff et al.

(10) Patent No.: US 8,177,542 B2
(45) Date of Patent: May 15, 2012

(54) ROTATING NOZZLE DIE MACHINE FOR EXTRUSION OF TWO OR MORE TYPES OF DOUGH

(75) Inventors: E. Terry Groff, Wernersville, PA (US); Joseph S. Zaleski, Jr., Mohrsville, PA (US); Kenneth J. Zvoncheck, Sinking Spring, PA (US)

(73) Assignee: Reading Bakery Systems, Robesonia, PA (US)

( * ) Notice: Subject to any disclaimer, the term of this patent is extended or adjusted under 35 U.S.C. 154(b) by 614 days.

(21) Appl. No.: 11/466,281

(22) Filed: Aug. 22, 2006

(65) Prior Publication Data
US 2008/0031988 A1    Feb. 7, 2008

Related U.S. Application Data

(60) Provisional application No. 60/710,221, filed on Aug. 22, 2005.

(51) Int. Cl.
*A23P 1/12* (2006.01)
*B29C 47/30* (2006.01)

(52) U.S. Cl. .................. 425/382.3; 425/131.1; 425/334; 425/382.2; 425/382.4; 425/462; 426/500; 426/504; 426/516; 426/517

(58) Field of Classification Search ............... 425/133.1, 425/66, 382.3, 381, 382 R, 190, 198, 319, 425/464, 131.5, 131.1, 132, 197, 200, 201, 425/205, 207, 238, 239, 241, 376.1, 382.2, 425/382 N, 382.4, 461, 462, 334; 426/103, 426/249, 282, 295, 383, 389, 448, 516, 517, 426/500, 504
See application file for complete search history.

(56) References Cited

U.S. PATENT DOCUMENTS

| | | | | |
|---|---|---|---|---|
| 1,709,280 A | * | 4/1929 | Ost | 425/131.1 |
| 2,049,362 A | * | 7/1936 | Farmer | 425/206 |
| 2,199,825 A | * | 5/1940 | Kretchmer | 425/319 |
| 2,856,868 A | * | 10/1958 | Kennedy | 426/500 |
| 3,180,912 A | * | 4/1965 | Rowe, Jr. | 264/172.17 |
| 3,241,503 A | | 3/1966 | Schafer | |
| 3,694,292 A | * | 9/1972 | Schippers et al. | 156/501 |
| 4,164,385 A | * | 8/1979 | Finkensiep | 425/204 |
| 4,288,463 A | * | 9/1981 | Groff et al. | 426/500 |
| 4,315,724 A | * | 2/1982 | Taoka et al. | 425/130 |

(Continued)

*Primary Examiner* — Joseph Del Sole
*Assistant Examiner* — Seyed Masoud Malekzadeh
(74) *Attorney, Agent, or Firm* — Panitch Schwarze Belisario & Nadel LLP

(57) ABSTRACT

The present invention comprises a rotary drive nozzle die machine for use with at least first and second dough extruders. The machine includes at least one rotatable nozzle having at least two openings for extruding at least two strands of dough therethrough, a first compression head for directing a first flow of a first type of dough under pressure from the first extruder toward the at least one rotatable nozzle and a second compression head for directing a second flow of a second type of dough under pressure from the second extruder toward the at least one rotatable nozzle. A mixing chamber is connected to the first and second compression heads for receiving the first and second flows of dough, for mixing the second dough into the first dough and for directing the mixed dough to the at least one rotatable nozzle and a drive assembly rotates the at least one nozzle whereby the at least two strands of the mixed dough extruded through the at least two openings of the at least one nozzle are spiral wound together to form a single dough stream.

15 Claims, 10 Drawing Sheets

U.S. PATENT DOCUMENTS

| | | | | |
|---|---|---|---|---|
| 4,329,163 A | * | 5/1982 | Russell | 65/438 |
| 4,358,468 A | * | 11/1982 | Dolan et al. | 426/250 |
| 4,445,838 A | * | 5/1984 | Groff | 425/319 |
| 4,524,081 A | * | 6/1985 | Bansal | 426/249 |
| 4,643,904 A | * | 2/1987 | Brewer et al. | 426/549 |
| 4,832,960 A | * | 5/1989 | Compagnon | 425/131.1 |
| 4,900,572 A | | 2/1990 | Repholz et al. | |
| 4,906,171 A | | 3/1990 | Miller | |
| 5,037,285 A | * | 8/1991 | Kudert et al. | 425/130 |
| 5,077,074 A | * | 12/1991 | Van Lengerich | 426/549 |
| 5,492,706 A | * | 2/1996 | Cockings et al. | 426/282 |
| 5,620,713 A | | 4/1997 | Rasmussen | |
| 5,626,892 A | * | 5/1997 | Kehoe et al. | 426/3 |
| 5,670,185 A | * | 9/1997 | Heck et al. | 425/133.1 |
| 5,834,040 A | * | 11/1998 | Israel et al. | 425/381 |
| 5,955,116 A | * | 9/1999 | Kehoe et al. | 425/131.1 |
| 6,276,919 B1 | * | 8/2001 | Jensen et al. | 425/323 |
| 6,332,767 B1 | * | 12/2001 | Kudert et al. | 425/130 |
| 6,379,733 B2 | * | 4/2002 | Matthews et al. | 426/516 |
| 6,428,830 B1 | | 8/2002 | Matthews et al. | |
| 6,431,847 B1 | * | 8/2002 | Hawley et al. | 425/113 |
| 6,450,796 B1 | * | 9/2002 | Groff et al. | 425/192 R |
| 6,506,401 B1 | * | 1/2003 | Rothamel et al. | 424/439 |
| 6,561,784 B1 | | 5/2003 | Atwell | |
| 6,626,660 B1 | | 9/2003 | Olson et al. | |
| 6,709,255 B2 | | 3/2004 | Kappes et al. | |
| 6,805,543 B2 | | 10/2004 | Fux et al. | |
| 6,896,504 B2 | * | 5/2005 | Horna et al. | 425/133.1 |
| 7,008,204 B2 | * | 3/2006 | Franke et al. | 425/71 |
| 7,192,541 B2 | * | 3/2007 | Ardouin | 264/1.29 |
| 7,270,531 B2 | * | 9/2007 | Proulx et al. | 425/198 |
| 2002/0079607 A1 | * | 6/2002 | Hawley et al. | 264/136 |
| 2002/0084281 A1 | * | 7/2002 | Horna et al. | 222/1 |
| 2003/0228400 A1 | * | 12/2003 | Dahl et al. | 426/282 |
| 2005/0226984 A1 | * | 10/2005 | Addington et al. | 426/549 |

* cited by examiner

ROTATING NOZZLE DIE MACHINE FOR EXTRUSION OF TWO OR MORE TYPES OF DOUGH

CROSS-REFERENCE TO RELATED APPLICATIONS

This application claims the benefit of Provisional Application No. 60/710,221 entitled Rotating Nozzle Die Machine for Dough Extrusion, filed Aug. 22, 2005, the contents of which are incorporated herein, by reference, in their entirety.

BACKGROUND OF THE INVENTION

The present invention relates to a rotary nozzle die machine for use with a dough extrusion machine and, more particularly, to such a rotary nozzle die machine for use with two or more types of dough for producing twisted or braided products.

It is known to provide a rotary nozzle die machine having rotating nozzles for use with a single dough extrusion machine to manufacture a spirally twisted or braided food product. For example, U.S. Patent No. 6,450,796 ("the '796 patent"), incorporated herein by reference in its entirety, discloses a rotary nozzle die machine having a plurality of such rotating nozzles. The machine disclosed in the '796 patent is adapted to produce a twisted food product (see FIG. 6) comprising a generally homogeneous food or dough material provided through a single dough feed extrusion machine. It is desirable to provide such a rotary nozzle die machine capable of producing twisted food products comprising two or more food or dough materials provided through two or more multiple dough feed extrusion machines with each dough feed having a different type of dough. The present invention meets this need and provides the ability to produce a multi colored braided food product containing two or three distinct colors. A machine in accordance with the present invention is also capable of producing a multi textured braided food product and a multi flavored braided food product by mixing together and braiding dough streams of different textures or flavors just prior to extrusion through a rotating nozzle.

BRIEF SUMMARY OF THE INVENTION

Briefly stated, in one embodiment the present invention comprises a rotary drive nozzle die machine for use with at least first and second dough extruders. The machine includes at least one rotatable nozzle having at least two openings for extruding at least two strands of dough therethrough, a first compression head for directing a first flow of a first type of dough under pressure from the first extruder toward the at least one rotatable nozzle and a second compression head for directing a second flow of a second type of dough under pressure from the second extruder toward the at least one rotatable nozzle. A mixing chamber is connected to the first and second compression heads for receiving the first and second flows of dough, for mixing the second dough into the first dough and for directing the mixed dough to the at least one rotatable nozzle and a drive assembly rotates the at least one nozzle whereby the at least two strands of the mixed dough extruded through the at least two openings of the at least one nozzle are spiral wound together to form a single dough stream.

In another embodiment, the present invention comprises a rotary drive nozzle die machine for use with at least first and second dough extruders. The machine includes at least one rotatable nozzle having three openings for extruding three strands of dough therethrough, a first compression head for directing a first flow of a first type of dough under pressure from the first extruder toward the at least one rotatable nozzle and a second compression head for directing a second flow of a second type of dough and a third flow of a third type of dough under pressure from the second extruder toward the at least one rotatable nozzle. A mixing chamber is connected to the first and second compression heads for receiving the first, second and third flows of dough, for mixing the second dough and the third dough into the first dough and for directing the mixed dough to the at least one rotatable nozzle. A drive assembly rotates the at least one rotatable nozzle whereby the three strands of the mixed dough extruded through the three openings of the at least one nozzle are spiral wound together to form a single dough stream.

In yet another embodiment, the present invention comprises a rotary drive nozzle die machine for use with at least first and second dough extruders. The machine includes at least one rotatable nozzle having a central opening and at least one non central opening for extruding at least two strands of dough therethrough, a first compression head for directing a first flow of a first type of dough under pressure from the first extruder to the non central opening of the at least one rotatable nozzle and a second compression head for directing a second flow of a second type of dough under pressure from the second extruder to the central opening of the at least one rotatable nozzle. A drive assembly rotates the at least one nozzle whereby a strand of dough of the second type is extruded through the central nozzle opening and a strand of dough of the first type is extruded through the non central nozzle opening and is spiral wound around the strand of dough of the second type to form a single dough stream.

BRIEF DESCRIPTION OF THE SEVERAL VIEWS OF THE DRAWINGS

The following detailed description of preferred embodiments of the invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings.

DETAILED DESCRIPTION OF THE INVENTION

Figure 1:
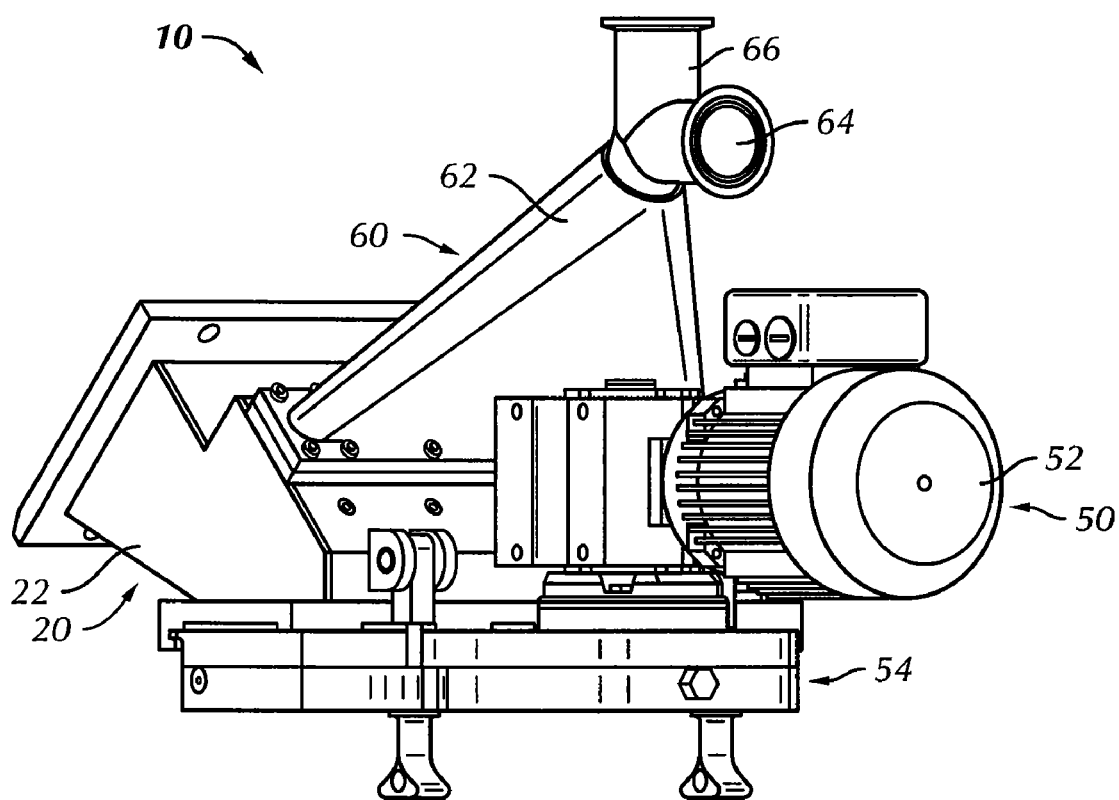
FIG. 1 is an upper side perspective view of a rotating nozzle die machine in accordance with a first preferred embodiment of the present invention.
Figure 2:
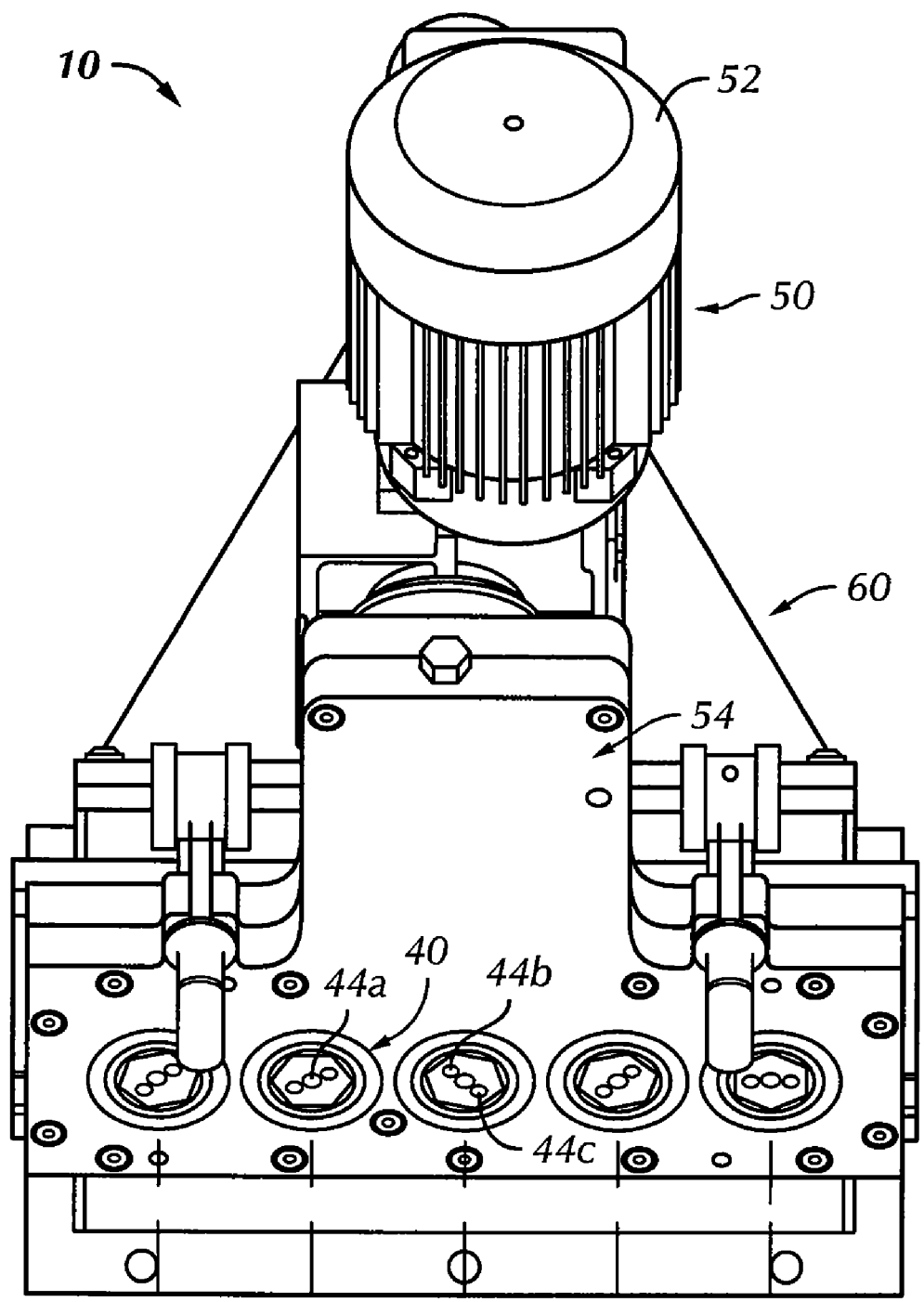
FIG. 2 is an upper front perspective view of the rotating nozzle die machine of FIG. 1.
Figure 3:
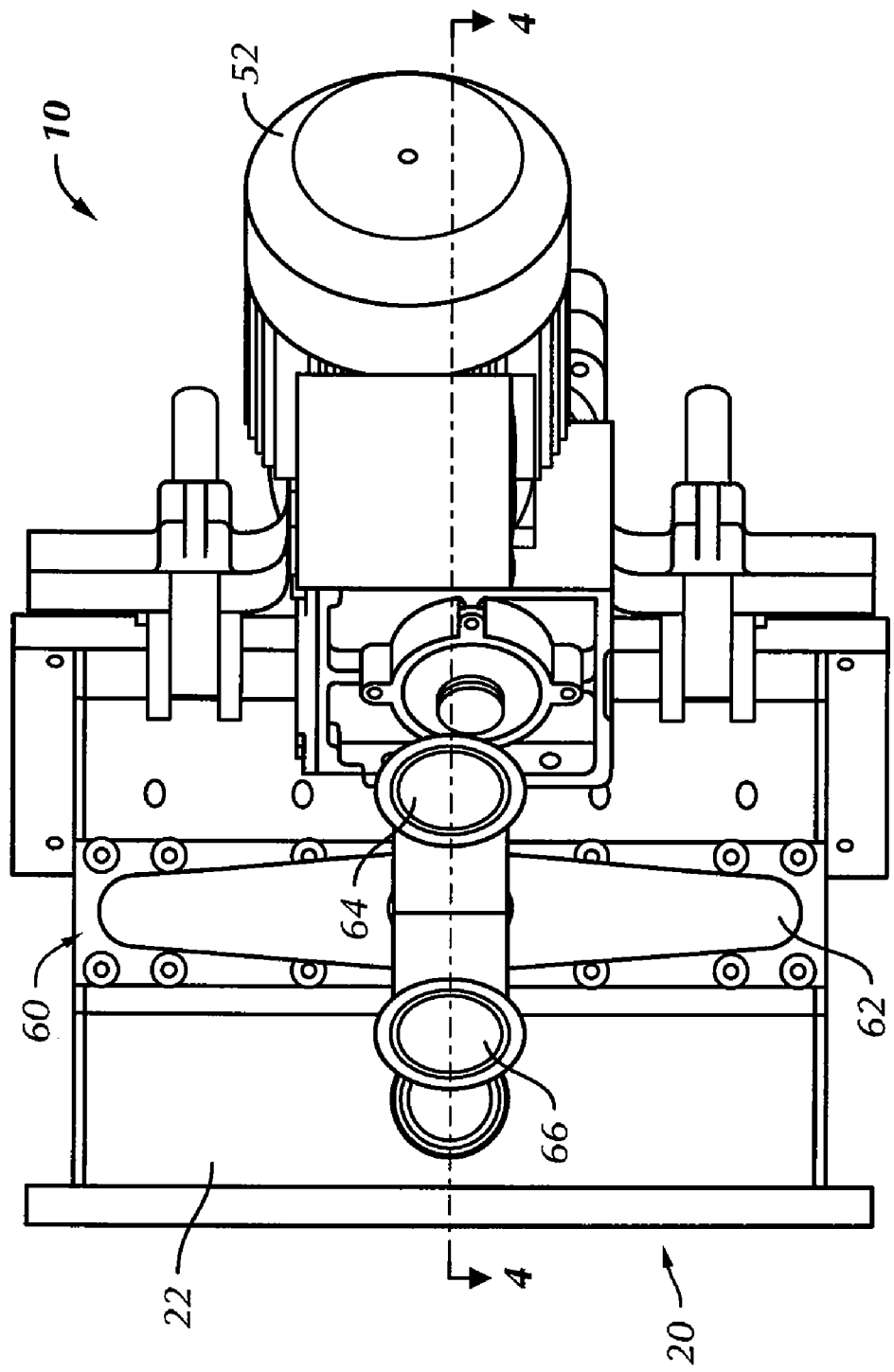
FIG. 3 is a top plan view of the rotating nozzle die machine of FIG. 1.

Certain terminology is used in the following description for convenience only and is not limiting. The words "right,"

"left," "lower" and "upper" designate directions in the drawings to which reference is made. The words "inwardly" and "outwardly" refer to directions toward and away from, respectively, the geometric center of the rotating nozzle die machine and designated parts thereof. The terminology includes the words specifically mentioned, derivatives thereof and words of similar import. Additionally, the word "a" as used in the specification means "at least one."

Referring to the drawings in detail, wherein like numerals indicate like elements throughout, there are shown in FIGS. 1-10 two presently preferred embodiments of a rotating nozzle die machine in accordance with the present invention. The die machine is preferably used in conjunction with at least two extruders (shown schematically in FIGS. 4 and 9)), such as a Dough Forming Extruder which is available from Reading Bakery Systems, the assignee of the present invention. In such extruders, dough or other food material is typically transported or carried under pressure typically by one or more augers from a source, such as a feed hopper to a compression head assembly as described below.

With reference initially to FIGS. 1-5, a first embodiment of a compression head assembly 10 is provided with three separate dough inlets 24, 64, and 66. The compression head assembly 10 comprises a first or primary compression head 20, at least one and preferably a multiple of rotatable or rotating nozzle assemblies 40, a drive assembly 50, and a second or secondary compression head 60. The primary compression head 20 includes a primary compression head housing 22 having an internal flow passage 28 for the movement of pressurized dough therethrough and toward the nozzle assemblies 40. The primary compression head flow passage 28 extends between a primary compression head inlet 24 and a primary compression head outlet 30. The primary compression head inlet 24 has a central longitudinal axis 26 and is connected to a first dough extruder 80 for receiving a first flow of a first type of dough under pressure. A pressure gauge port 29 is provided in the primary compression head housing 22 to allow pressure in the primary compression head flow passage 28 to be monitored.

Pressurized dough from the first or primary compression head 22 flows out of the primary head outlet 30, into a mixing chamber 34 and thereafter into a converging inlet 42 of the rotating nozzle assemblies 40. A plurality of nozzle flow passages 48 connect the converging inlet 42 with a corresponding plurality of nozzle outlets 44a, 44b and 44c of each nozzle assembly 40. Each of the plurality of rotating nozzles or nozzle assemblies 40 is driven for rotation about an axis of rotation 46 by a drive assembly 50, including a drive motor 52 and a drive mechanism assembly 54. Preferably, each rotating nozzle assembly 40 includes at least two openings or outlets and in the present embodiment each such rotating nozzle assembly 40 includes at least three such openings, a central nozzle opening or outlet 44a centered about its own axis of rotation 46, and two lateral nozzle outlets 44b and 44c each radially offset from the axis of rotation 46 on opposite sides of the central nozzle opening 44a. Preferably the three nozzle openings 44a, 44b and 44c are arranged along a single row. The rotating nozzle assemblies 40 and drive assembly 50 are similar to corresponding components disclosed in the '796 patent. However, a comparison of FIGS. 2 and 7 of the present application with FIG. 3 of the '796 patent shows one difference between the rotating nozzle assemblies of the '796 patent and the rotating nozzle assemblies 40 of the present invention. Specifically, the nozzle outlet openings disclosed in FIG. 3 of the '796 patent are arranged in a generally triangular fashion, while the nozzle outlet openings 44a, 44b and 44c of the present embodiment are preferably arranged in a generally straight row with the central nozzle opening 44a being generally centrally located i.e. generally along the axis of rotation 46 of the nozzle assembly 40. Implications of the in-line arrangement of the nozzle openings 44a, 44b and 44c are discussed further below. It will be appreciated by those skilled in the art that in particular applications the number, spacing and locations of the nozzle openings may vary from what has been shown and described.

The nozzle axes of rotation 46 are orientated at an angle of approximately 45 degrees to the central longitudinal axis 26 of the first or primary compression head inlet 24. In contrast, in the '796 patent, a corresponding nozzle axis of rotation is substantially parallel to the corresponding primary compression head inlet central longitudinal axis. By thus "tilting" the rotating nozzle assemblies 40 at a non-parallel, non-perpendicular angle relative to the primary compression head inlet 24, and rotating the drive assembly 50, space is provided for the secondary compression head 60. The secondary compression head 60 allows second and/or third different types of dough to be injected into or mixed with the dough of the first type entering through the primary head inlet 24 and flowing through the primary head flow passage 28 just prior to the mixed dough being extruded through the openings of the nozzle assemblies 40.

Figure 4:
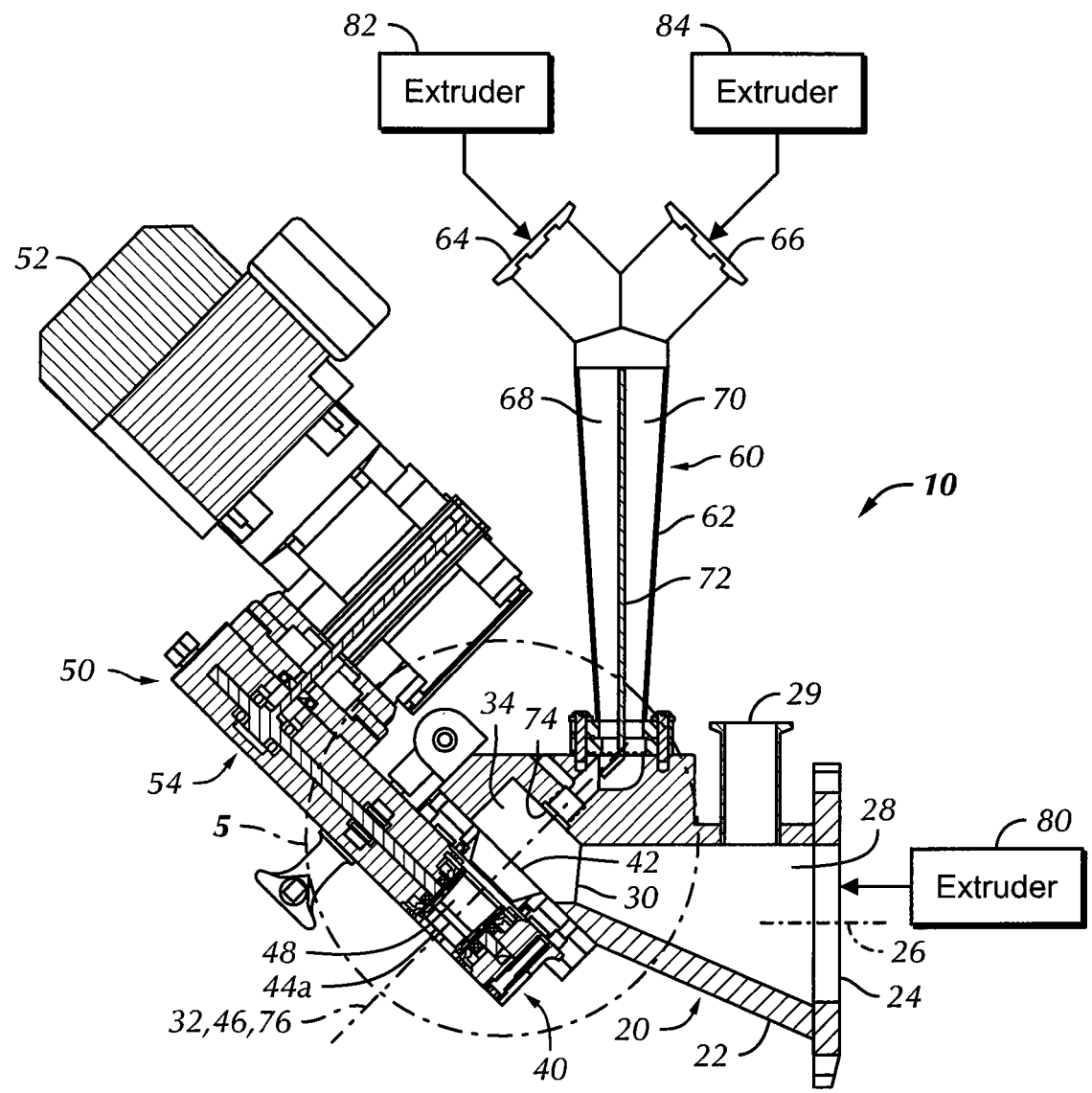
FIG. 4 is cross-section side view of the rotating nozzle die machine of FIG. 1, taken along line A-A of FIG. 3.
Figure 5:
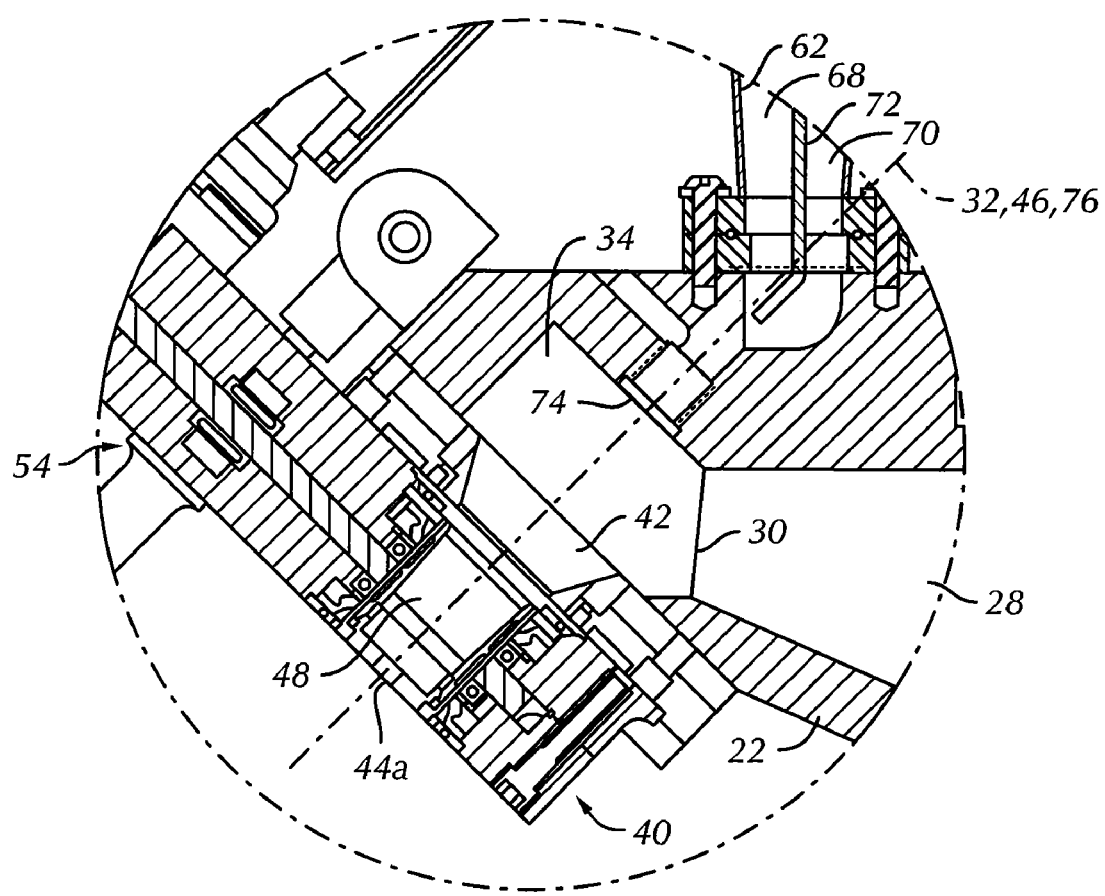
FIG. 5 is an enlarged detail view of the rotating nozzle portion of the rotating nozzle die machine of FIG. 4.
Figure 6:
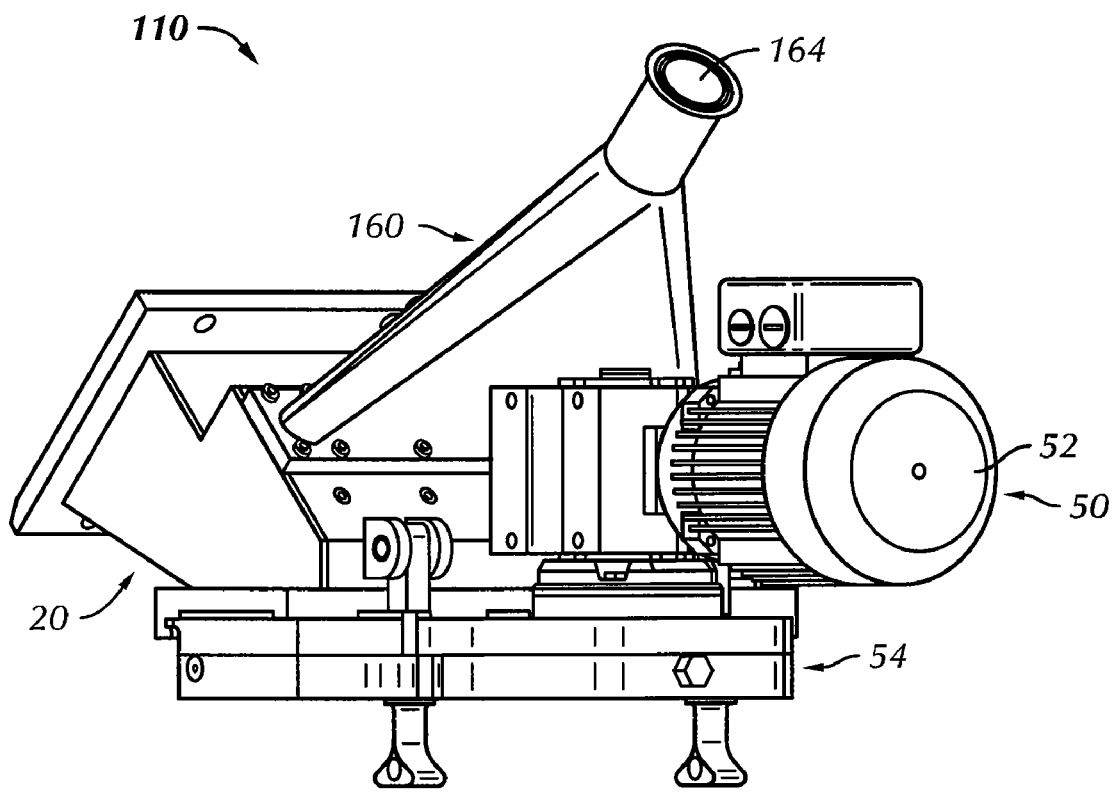
FIG. 6 is an upper side perspective view of a rotating nozzle die machine in accordance with a second preferred embodiment of the present invention.
Figure 7:
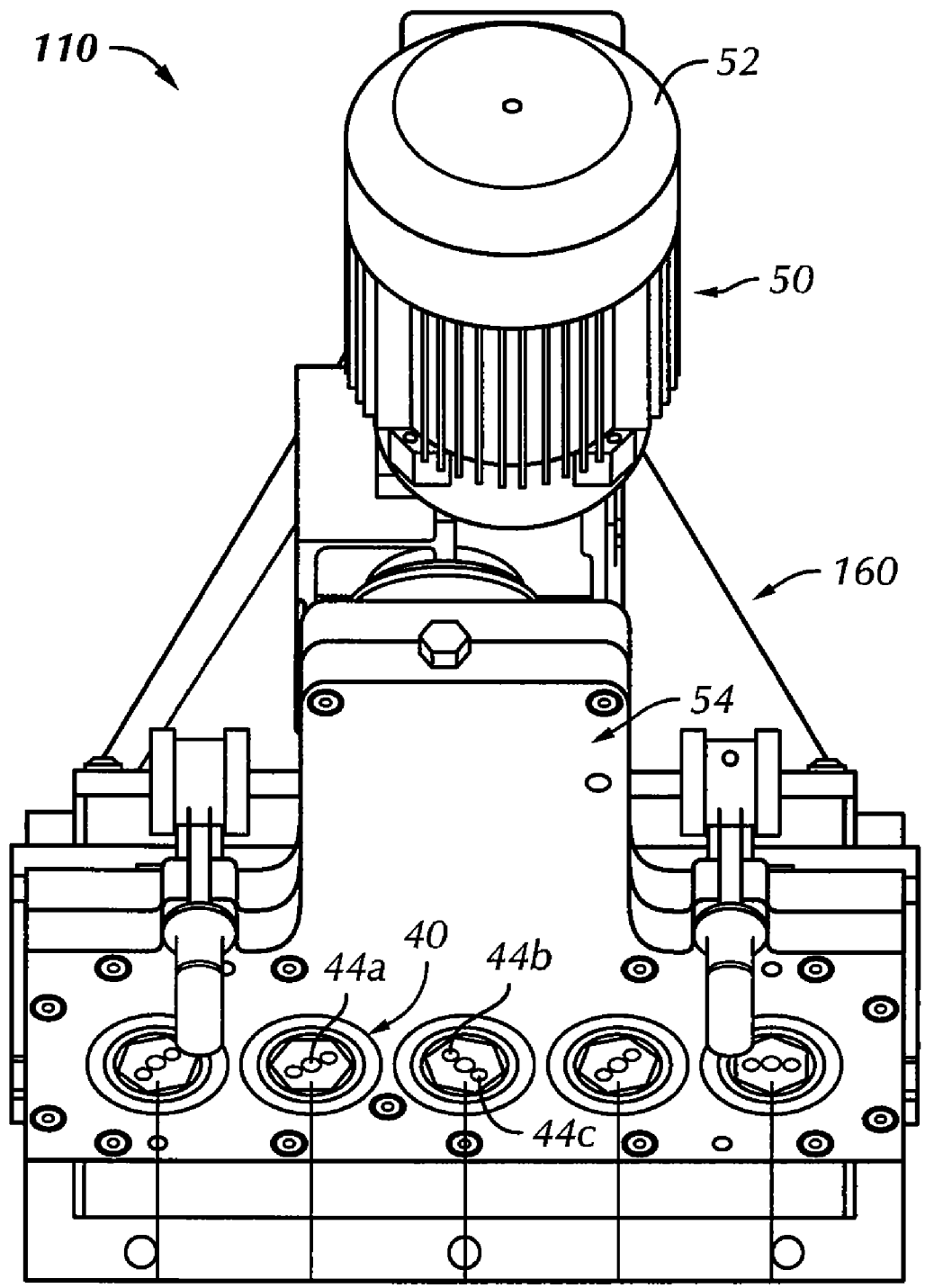
FIG. 7 is an upper front perspective view of the rotating nozzle die machine of FIG. 6.
Figure 8:
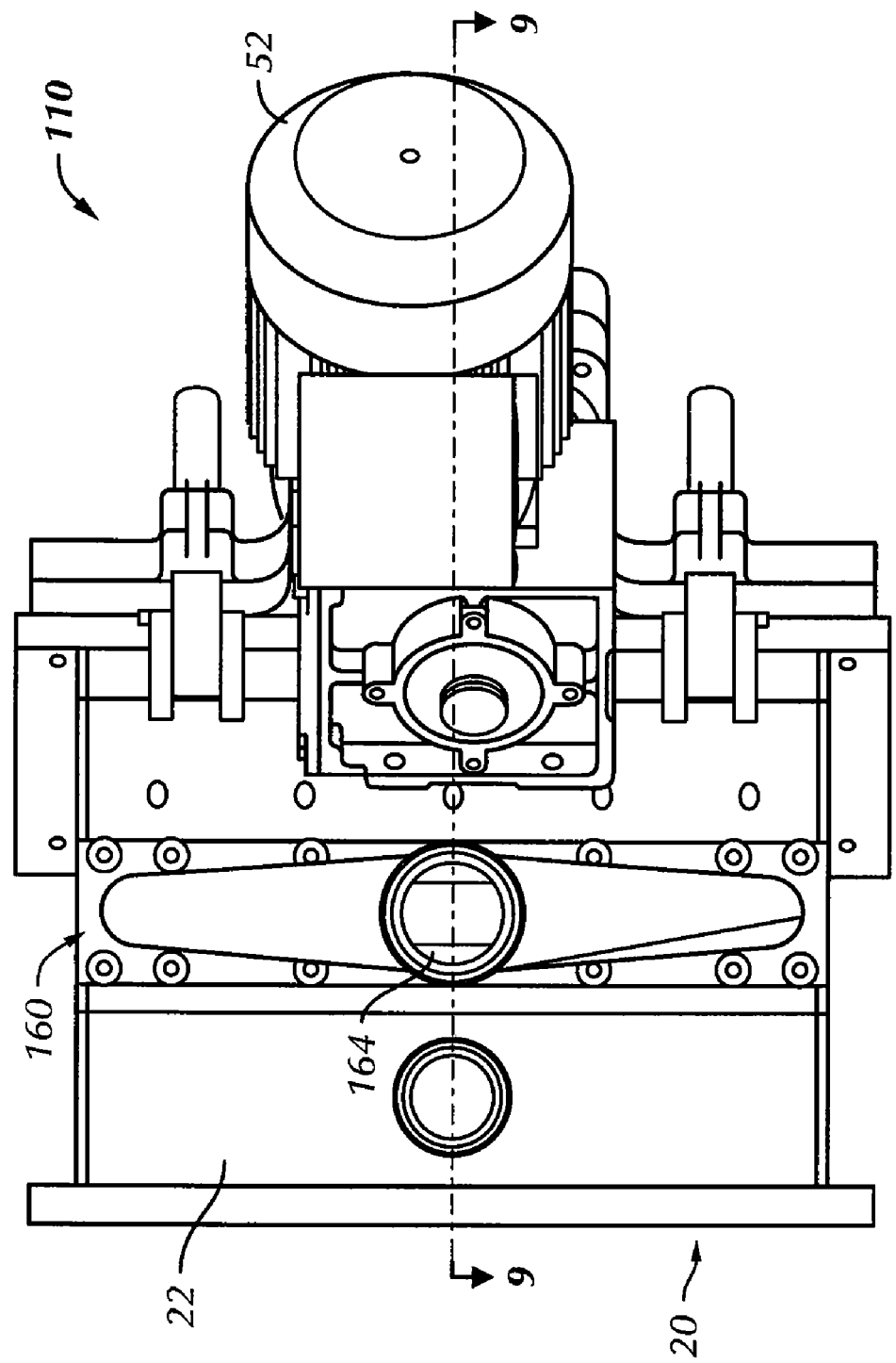
FIG. 8 is a top plan view of the rotating nozzle die machine of FIG. 6.
Figure 9:
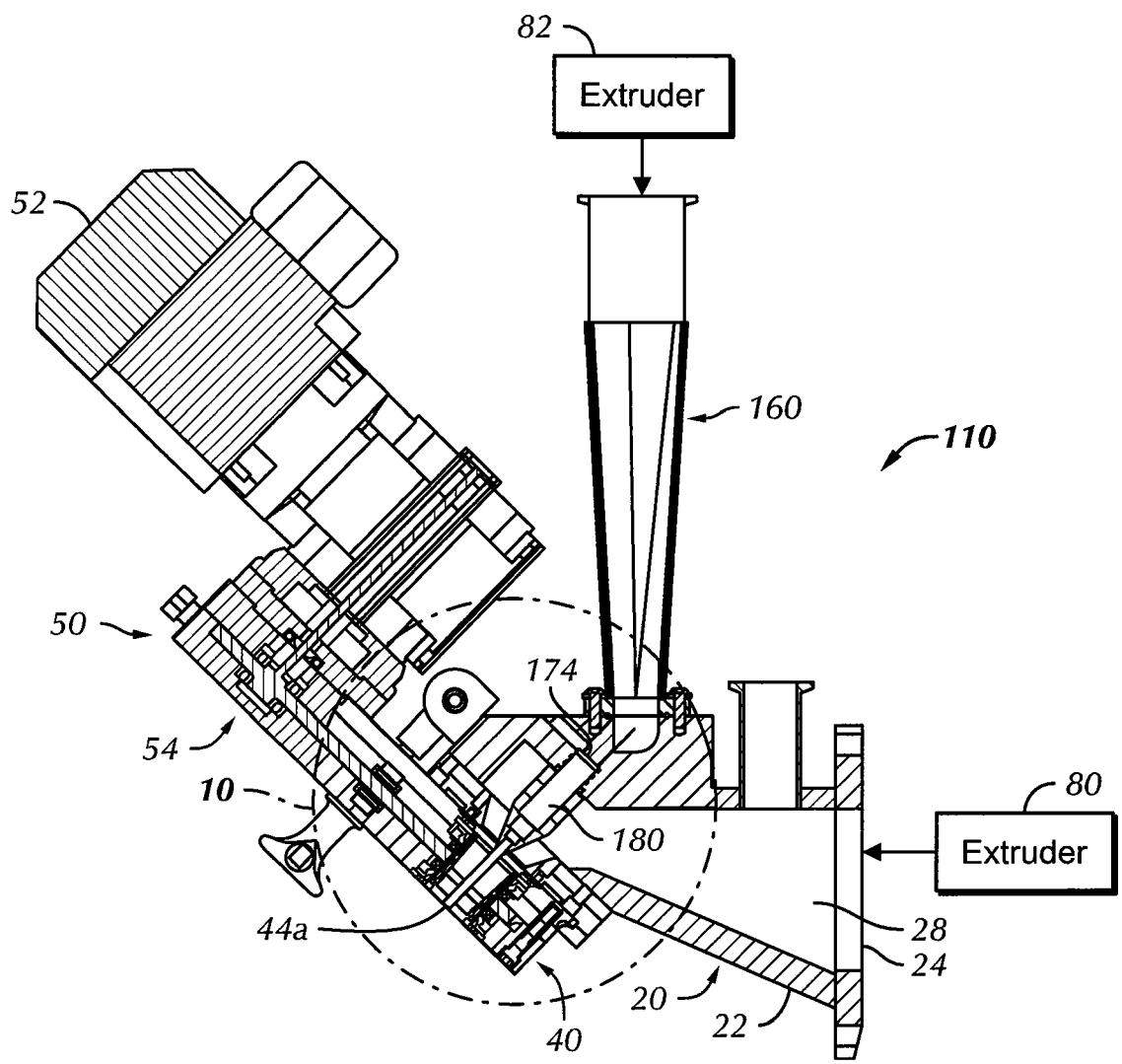
FIG. 9 is cross-section side view of the rotating nozzle die machine of FIG. 6, taken along line A-A of FIG. 8.
Figure 10:
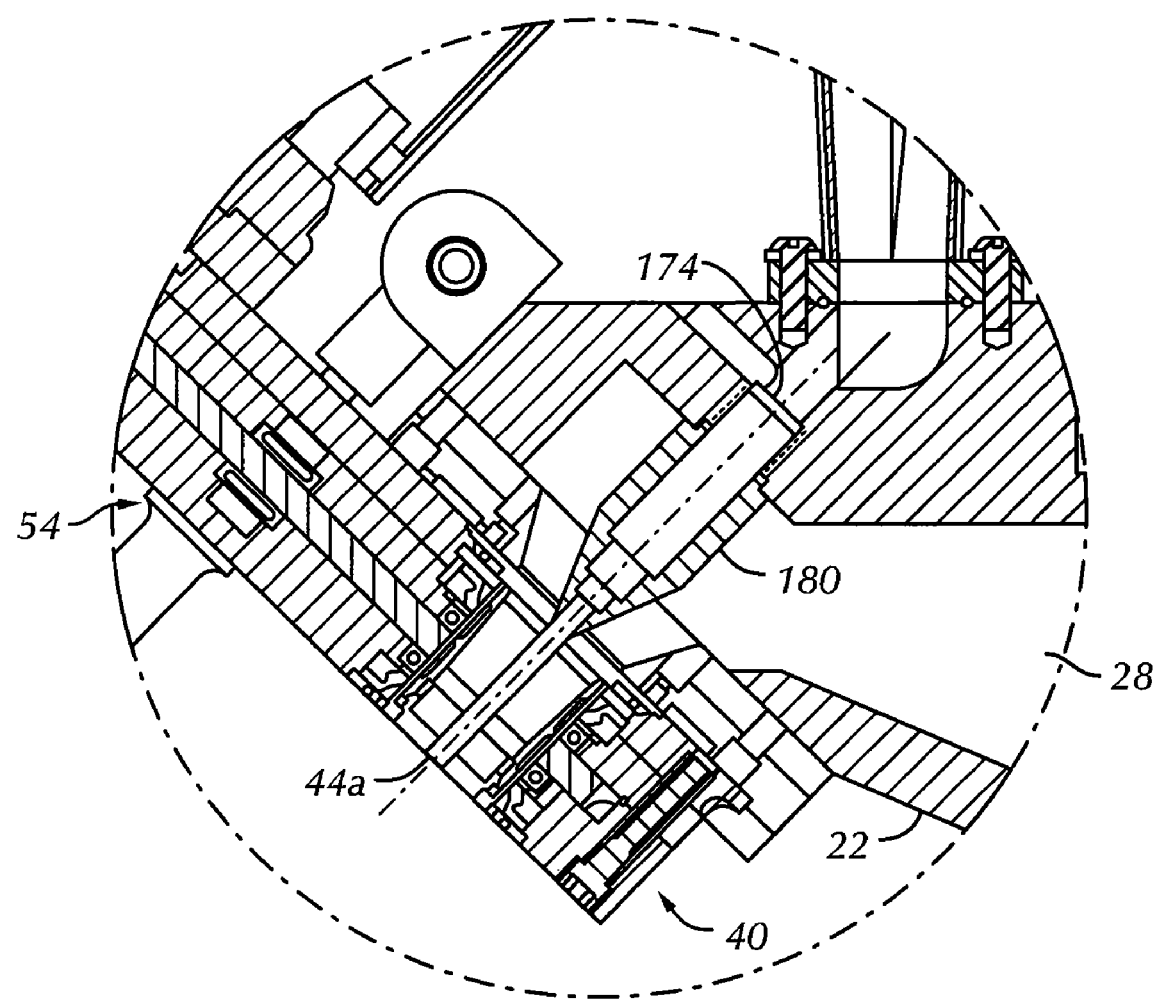
FIG. 10 is an enlarged detail view of the rotating nozzle portion of the rotating nozzle die machine of FIG. 9.

The second or secondary compression head 60 includes a secondary compression head housing 62, having spaced apart inlets 64, 66, respectively. The secondary compression head housing 62 has an outlet 74, having a central longitudinal axis 76 which is preferably aligned with the rotating nozzle axes of rotation 46. The secondary compression head housing outlet 74 is connected to the inlets 64, 66 by flow passages 68 and 70, respectively. The flow passages 68, 70 are separated by a flow divider 72. It will be appreciated that the secondary compression head 60 may comprise a single, undivided housing 62 (i.e. without the divider 72) if desired. As shown in FIG. 4, a second type of dough under pressure from a second extruder 82 flows into inlet 64, along flow passage 68, out of the outlet 74 and into the mixing chamber 34. Similarly, a third type of dough under pressure from a third extruder 84 under pressure flown in to inlet 66, along flow passage 70, out of outlet 74 and into the mixing chamber 34. The second and third types of dough are inserted into or mixed with the first type of dough in the mixing chamber 34 before the mixed dough passes through the converging inlet 42 to the rotating nozzle assemblies 40. In some applications both the second and third types of dough may come from a single extruder.

For purposes of explaining the present invention the dough is stated as being of first, second or third "types." The term "types" is intended to encompass its broadest meaning. For example, the first and second types of dough may be made from the exact same ingredients with one dough being one color, such as red, and the other dough being another color, such as green. Additionally, the first and second types of dough may be made from all of the same ingredients except the first dough may be a first flavor, such as vanilla, and the second dough may be another flavor, such as butter. Further, the first dough may be made from ingredients that give it a softer or gummier texture while the second dough may be made from ingredients that give it a harder or more brittle texture. Thus it should be clearly understood that any variation, even a minor variation, such as color or shades of color, could result in a different type of dough. Additionally, the second and third types of dough could be exactly the same in some applications.

In operation of the die machine, a first type of dough (not illustrated) from the first extruder 80 enters the primary head inlet 24 under pressure, and passes through the primary head flow passage 28, out of the outlet 30 and into the mixing chamber 34. Simultaneously, second and third types of dough (not illustrated) enter the secondary compression head 60 inlets 64 and 66 under pressure, pass through the flow passages 68 and 70, out of the outlet 74 and into the mixing chamber 34 where they are injected into or mixed with the first type of dough. Thereafter the mixed dough flows through the converging inlet 42 and then to the rotating nozzle assemblies 40. Significantly, the first, second and/or third types of dough are not mixed until just slightly before being extruded through the openings in the nozzle assemblies 40.

The three individual streams of the first, second and third types of dough mix in the mixing chamber 34 in a seemingly random manner. However, the manner in which the three streams of dough are mixed is repeatable and subject to precise control by controlling the extruders 80, 82 and 84 to control the individual pressures at which each of the individual dough streams are injected into the mixing chamber 34. The resulting dough mixture is extruded through the rotating nozzles 40, and is deposited onto a conveyor belt (not shown) for further processing. The degree of spiral winding or twisting created in the final product is controlled by controlling the rotational speed of the rotating nozzles 40 relative to the speed of the conveyor belt.

Thus, as described, the compression head assembly 10, having both primary and secondary compression heads 20, 60 along with the rotating nozzle assemblies 40 as illustrated, is capable of combining three separate streams of differing types of dough, including but not limited to variations in color, textures, and/or flavors into braided (or twisted) food products. Note that one implication of the in-line arrangement of the nozzle outlets 44a, 44b and 44c is that the braided food product produced includes a central, substantially un-spiraled strand formed by the central nozzle outlet 44a, and two additional strands formed by the lateral nozzle outlets 44b and 44c, spiraled about the central strand.

The various components of the compression head assembly 10 are preferably fabricated from conventional, food-grade materials such as stainless steel using conventional manufacturing techniques such as stamping and milling.

With reference now to FIGS. 6-10, a second embodiment compression head assembly 110 is generally similar to the first embodiment compression head assembly 10, with several notable exceptions. Like numerals have been used to identify like elements in the first and second embodiments. First, the second embodiment secondary compression head assembly 160 is provided with a single inlet 164 for receiving a single second type of dough, and is preferably not provided with a flow divider. Second, unlike the first embodiment, there is no mixing chamber for the dough streams to mix together before passing to the nozzle assemblies 40. Instead, an inner nozzle 180 is provided for each of the rotating nozzle assemblies 40, connecting the outlet 174 of the secondary compression head assembly 160 directly with the center opening 44a of each rotating nozzle assembly 40. The inner nozzle 180 is stationary, and feeds the second type of dough associated with the central, un-spiraled strand of the braided food product directly to the central opening 44a, as discussed above. Operation of the second embodiment compression head assembly 110 is similar to the operation of the first embodiment compression head assembly 10 as described above. The second embodiment compression head assembly 100 is thus capable of combining streams of two different types of dough, differing in color, texture, flavor, etc. into a braided (or twisted) food product in which the central extruded strand is formed of the second type of dough and the other two, spiral strands of extruded dough are formed of the first type of dough.

It will be appreciated by those skilled in the art that changes could be made to the preferred embodiments 10, 110 of the rotating nozzle die machine described above without departing from the broad inventive concept thereof. It is understood, therefore, that this invention is not limited to the particular embodiments disclosed, but is intended to cover modifications within the spirit and scope of the present application as defined by the appended claims.

We claim:

1. A rotary drive nozzle die machine for use with at least first and second dough extruders comprising:
  a plurality of rotatable nozzles each having:
    at least two openings to extrude at least two strands of dough therethrough;
  a converging inlet in communication with the plurality of rotatable nozzles, the converging inlet having an inlet and an outlet that is smaller than the inlet;
  a first compression head to direct a first flow of a first type of dough under pressure from the first extruder toward the plurality of rotatable nozzles;
  a second compression head to direct a second flow of a second type of dough under pressure from the second extruder toward the plurality of rotatable nozzles, wherein the first and second compression heads each have an inlet and an outlet that is smaller than the inlet;
  a mixing chamber connected to the first and second compression heads downstream from the first and second compression heads and configured to receive the first and second flows of dough from the first and second compression heads, to mix the second dough into the first dough to form a mixed dough and to direct the mixed dough to the plurality of rotatable nozzles, wherein the mixing chamber is directly adjacent to and upstream the converging inlet; and
  a drive assembly to rotate the plurality of rotatable nozzles wherein the at least two strands of the mixed dough extruded through the at least two openings of the plurality of rotatable nozzles are spiral wound together to form a single dough stream.

2. The rotary drive nozzle die machine as recited in claim 1, wherein the plurality of rotatable nozzles each have three openings that are generally equally spaced apart and are arranged in a generally straight row with one of the nozzle openings lying along a central axis of rotation of the plurality of rotatable nozzles.

3. A rotary drive nozzle die machine for use with at least first, second and third dough extruders comprising:
  a plurality of rotatable nozzles each having:
    three nozzle openings to extrude three strands of dough therethrough;
  a converging inlet in communication with the plurality of rotatable nozzles, the converging inlet having an inlet and an outlet that is smaller than the inlet;
  a first compression head to direct a first flow of a first type of dough under pressure from the first extruder toward the plurality of rotatable nozzles;
  a second compression head having:
    a first and a second flow passage, and
    spaced apart first and second inlets in communication with the first and the second flow passages, respectively, to direct a second flow of a second type of dough and a third flow of a third type of dough under pressure from the second and the third extruder toward the plurality of rotatable nozzles, wherein the first, second and third compression heads each have an inlet and an outlet that is smaller than the inlet;

a mixing chamber connected to the first and second compression heads downstream from the first and second compression heads and configured to receive the first, second and third flows, to mix the second type of dough and the third type of dough from the first and second compression heads into the first type of dough to form a mixed dough and to direct the mixed dough to the plurality of rotatable nozzles, wherein the mixing chamber is directly adjacent to the converging inlet; and a drive assembly to rotate the plurality of rotatable nozzles wherein the three strands of the mixed dough extruded through the three nozzle openings of the plurality of rotatable nozzles are spiral wound together to form a single dough stream.

4. The rotary drive nozzle die machine as recited in claim 3, wherein the three nozzle openings are generally equally spaced apart and are arranged in a generally straight row with one of the nozzle openings lying along a central axis of rotation of the plurality of rotatable nozzles.

5. A rotary drive nozzle die machine for use with at least first and second dough extruders comprising:

at least one rotatable nozzle having:
a central opening,
at least one non-central opening, and
an axis of rotation;

a first compression head to direct a first flow of a first type of dough under pressure from the first extruder to the at least one non-central opening of the at least one rotatable nozzle, a second compression head to direct a second flow of a second type of dough under pressure from the second extruder to the central opening of the at least one rotatable nozzle, the second compression head having an inlet and an outlet;

at least one inner nozzle connected to the outlet of the second compression head and the central opening of the at least one rotatable nozzle, wherein the inner nozzle is configured to receive the second type of dough and feed the second type of dough directly to the central opening to prevent mixing of the second type and first type of dough prior to extrusion through the central and non-central openings of the at least one rotatable nozzle; and a drive assembly to rotate the at least one nozzle wherein a strand of dough of the second type is extruded through the central nozzle opening and a strand of dough of the first type is extruded through the non-central nozzle opening and is spiral wound around the strand of dough of the second type to form a single dough stream.

6. The rotary drive nozzle die machine as recited in claim 5, wherein the at least one rotatable nozzle includes at least three nozzle openings generally equally spaced apart and arranged in a generally straight row with the central opening lying along a central axis of rotation of the nozzle.

7. The rotary drive nozzle die machine of claim 1, wherein the plurality of rotatable nozzles each have an axis of rotation configured such that the axis of rotation is at a non-parallel, non-perpendicular angle with respect to a central longitudinal axis of the first compression head.

8. The rotary drive nozzle die machine of claim 7, wherein the angle is approximately 45 degrees.

9. The rotary drive nozzle die machine of claim 7, wherein the second compression head includes an outlet having a central longitudinal axis aligned with the axis of rotation of the plurality of rotatable nozzles.

10. The rotary drive nozzle die machine of claim 1, wherein at least one of the first and second compression heads includes at least two inlets for simultaneously receiving at least two dough types.

11. The rotary drive nozzle die machine of claim 1, wherein the mixing chamber includes:

a first inlet for receiving the first flow of the first type of dough from the first compression head, the first inlet having a central longitudinal axis parallel with a central axis of rotation of the plurality of rotatable nozzles; and a second inlet for receiving the second flow of the second type of dough from the second compression head, the second inlet having a central longitudinal axis at a non-parallel, non-perpendicular angle with respect to the central longitudinal axis of the first inlet.

12. The rotary drive nozzle die machine of claim 11, wherein the angle is approximately 45 degrees.

13. The rotary drive nozzle die machine of claim 3, wherein the mixing chamber includes:

a first inlet having a central longitudinal axis parallel with a central axis of rotation of the plurality of rotatable nozzles; and a second inlet having a central longitudinal axis at an angle with respect to the central longitudinal axis of the first inlet.

14. The rotary drive nozzle die machine of claim 13, wherein the angle is approximately 45 degrees.

15. The rotary drive nozzle die machine of claim 1, wherein the first compression head includes a pressure gauge port to allow pressure within the first compression head to be monitored.

* * * * *